(12) United States Patent
Horii et al.

(10) Patent No.: US 9,997,301 B2
(45) Date of Patent: Jun. 12, 2018

(54) ELECTRODE, ELECTRIC DOUBLE-LAYER CAPACITOR USING THE SAME, AND MANUFACTURING METHOD OF THE ELECTRODE

(71) Applicant: NIPPON CHEMI-CON CORPORATION, Shinagawa-ku, Tokyo (JP)

(72) Inventors: Daisuke Horii, Inagi (JP); Shuichi Ishimoto, Kawasaki (JP); Satoru Tsumeda, Kawasaki (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 137 days.

(21) Appl. No.: 14/827,420

(22) Filed: Aug. 17, 2015

(65) Prior Publication Data
US 2015/0357127 A1   Dec. 10, 2015

Related U.S. Application Data

(63) Continuation of application No. PCT/JP2014/054022, filed on Feb. 20, 2014.

(30) Foreign Application Priority Data

Feb. 20, 2013  (JP) .................................. 2013-031574
May 21, 2013   (JP) .................................. 2013-107508

(51) Int. Cl.
*H01G 11/42*   (2013.01)
*H01G 11/40*   (2013.01)
(Continued)

(52) U.S. Cl.
CPC ............. *H01G 11/60* (2013.01); *H01G 11/24* (2013.01); *H01G 11/28* (2013.01); *H01G 11/34* (2013.01);
(Continued)

(58) Field of Classification Search
CPC ........ H01G 11/60; H01G 11/42; H01G 11/40; H01G 11/34; H01G 11/86
(Continued)

(56) References Cited

U.S. PATENT DOCUMENTS 5,754,393 A     5/1998 Hiratsuka et al.
2004/0017647 A1  1/2004 Okamoto et al.
(Continued)

FOREIGN PATENT DOCUMENTS

CN   102439671 A   5/2012
JP   8-306591 A    11/1996
(Continued)

OTHER PUBLICATIONS

Extended European search report for European Patent Application No. 14753693.2, dated Sep. 5, 2016.
(Continued)

*Primary Examiner* — Eric Thomas
*Assistant Examiner* — Arun Ramaswamy
(74) *Attorney, Agent, or Firm* — Shapiro, Gabor and Rosenberger, PLLC

(57) ABSTRACT

Provided are an electrode formed by mixing carbon powder and a fibrous carbon, wherein influence of a resin-based binder or the like and an conductivity promoting material or the like is eliminated to have low electric resistance and an excellent property of capacitance; an electric double-layer capacitor using the electrodes; and a manufacturing method of the electrode. Provided is a dispersion step in which the carbon powder with a particle size of less than 100 nm and the fibrous carbon are dispersed into a solvent. The dispersion step is to allow jets of the solution to collide with each other or to apply shear stress and centrifugal force to the solution, thereby dispersing the carbon powder and the fibrous carbon. Furthermore, the method comprises the sheet
(Continued)

electrode forming step in which the solution subjected to the dispersion step is filtered to obtain the carbon powder/fibrous carbon sheet.

20 Claims, 7 Drawing Sheets

(51) Int. Cl.
- H01G 11/36 (2013.01)
- H01G 11/86 (2013.01)
- H01G 9/00 (2006.01)
- H01G 11/60 (2013.01)
- H01G 11/28 (2013.01)
- H01G 11/34 (2013.01)
- H01G 11/38 (2013.01)
- H01G 11/24 (2013.01)

(52) U.S. Cl.
CPC ........... *H01G 11/36* (2013.01); *H01G 11/38* (2013.01); *H01G 11/40* (2013.01); *H01G 11/42* (2013.01); *H01G 11/86* (2013.01); *Y02E 60/13* (2013.01)

(58) Field of Classification Search
USPC .................... 361/502, 303; 429/521, 523
See application file for complete search history.

(56) References Cited

U.S. PATENT DOCUMENTS

| 2011/0111279 A1 | 5/2011 | Smithyman et al. |
| 2012/0007027 A1 | 1/2012 | Istvan et al. |
| 2012/0132861 A1 | 5/2012 | Tamamitsu et al. |

FOREIGN PATENT DOCUMENTS

| JP | 2000-124079 A | 4/2000 |
| JP | 2001-237149 A | 8/2001 |
| JP | 2003-257797 A | 9/2003 |
| JP | 2003-297695 A | 10/2003 |
| JP | 2006-032371 A | 2/2006 |
| JP | 2007-160151 A | 6/2007 |
| JP | 2007-200979 A | 8/2007 |
| JP | 2007-320842 A | 12/2007 |
| JP | 2009-246306 A | 10/2009 |
| JP | 2010-087302 A | 4/2010 |
| JP | 2010-098020 A | 4/2010 |
| JP | 2011-181229 A | 9/2011 |
| WO | WO 2010/100954 A1 | 9/2010 |

OTHER PUBLICATIONS

International Search Report from International Patent Application No. PCT/JP2014/054022, dated Apr. 15, 2014.
Office Action dated Feb. 20, 2018, in Japanese Patent Application No. 2014-031101.
Office Action dated Feb. 20, 2018, in Japanese Patent Application No. 2014-031069.
Office Action dated Mar. 20, 2018, in Japanese Patent Application No. 2015-501496.
Office Action dated Nov. 15, 2017, in Chinese Patent Application No. 201480005593.9.

ELECTRODE, ELECTRIC DOUBLE-LAYER CAPACITOR USING THE SAME, AND MANUFACTURING METHOD OF THE ELECTRODE

CROSS-REFERENCE TO RELATED APPLICATIONS

This application is a Continuation of PCT Application No. PCT/JP2014/054022, filed on Feb. 20, 2014, and claims priorities to Japanese Patent Application No. 2013-31574, filed on Feb. 20, 2013, Japanese Patent Application No. 2013-107508, filed on May 21, 2013, the entire contents all which are incorporated herein by reference.

TECHNICAL FIELD

The present invention relates to an electrode utilizing a carbon material, an electric double-layer capacitor using the electrodes, and a manufacturing method of the electrode. In particular, as the carbon material, carbon powder and a fibrous carbon are utilized.

BACKGROUND ART

Conventionally, an electric double-layer capacitor comprises a pair of electrodes, a separator provided between the electrodes, and collection layers of each electrode. In typical electrodes used for the electric double-layer capacitor, a carbon material such as carbon powder and a fibrous carbon is used.

As a manufacturing method of the electrode used for the electric double-layer capacitor, a method for adding a conductive material such as acetylene black, and a resin such as polytetrafluoroethylene and tetrafluoroethylene resin as a binder, to activated carbon powder which is a typical material of the electrode and mixing the resultant before pressure-molding to form a sheet-like polarized electrode is known. Moreover, a method for adding the mixture to a solvent and applying the resultant to a current collector (Coating method) is also suited.

Such an electric double-layer capacitor has a problem of reduction in capacitance when left under high temperature environment, which is seemed to be caused by a reaction of functional groups on a surface of the activated carbon. Although various proposals have been made to solve this problem, the results are not sufficient. In contrast, since a carbon nanotube has few such functional groups, it is known that its lifespan property is better than that of the activated carbon.

Thus, for increasing the capacitance, there is an attempt to use a sheet-like polarized electrode formed by mixing the activated carbon, the carbon nanotube, and the resin-based binder before pressure-molding (see for example, JP 2001237149 A and JP 2000124079 A).

In such an electrode for the electric double-layer capacitor, the resin-based binder is used when pressure-molding and applying a mixed solution of activated carbon powder and the like to the current collector. However, in an aspect of reduction in resistance of the electrode, since the resin-based binder acts as an impurity, there is a problem that the electrode obtained by using the resin-based binder has high resistance.

SUMMARY

Therefore, an object of the present invention is to provide: an electrode formed by mixing carbon powder and a fibrous carbon, wherein the electrode has low electric resistance; an electric double-layer capacitor using the electrodes; and a manufacturing method of the electrode.

In order to achieve the above-mentioned object, the electrode of the present invention is obtained by removing a solvent from a solution in which pore-forming-treated carbon powder with an average particle diameter of less than 100 nm and a fibrous carbon are dispersed. Moreover, the solvent may be removed by filtering the solution. In the electrode obtained by removing the solvent from the solution in which the carbon powder and the fibrous carbon are mixed, the fibrous carbon serves like a binder. As the fibrous carbon may be concurrently used with the resin-based binder, the resin-based binder can be used at a ratio less likely to influence the electric resistance and the influence of the resin-based binder on the electric resistance can be eliminated even when the resin-based binder is used and thus, the electric resistance of the obtained electrode can be lowered.

The carbon powder may be made by activating carbon black.

The carbon powder and the fibrous carbon can be highly dispersed and have electrode density of 0.48 g/cc or more.

The fibrous carbon can be contained at 10 to 30% by weight with respect to the total amount of the carbon powder and the fibrous carbon.

Among pores in the pore-forming-treated carbon powder, the percentage of mesopores may be within a range of 5 to 55%.

A particle size distribution of an aggregate of the carbon powder and the fibrous carbon constituting the electrode may have a single peak, and a ratio D90/D50, that is, a ratio between 50% cumulative particle diameter D50 and 90% cumulative particle diameter D90 in the above-mentioned particle size distribution, is 2.5 or less.

The 90% cumulative particle diameter D90 in the above-mentioned particle size distribution may be less than 110 μm.

Intervals between the fibrous carbon constituting the electrode may be 2 μm or less.

Moreover, an electric double-layer capacitor in which the electrodes are impregnated with a mixture of sulfolane and a sulfolane compound, which has a side chain on a sulfolane skeleton, or chain sulfone, and an electric double-layer capacitor in which the electrodes are formed on a current collector are also one aspects of the present invention.

Moreover, in order to achieve the above-mentioned object, the manufacturing method of the electrode of the present invention comprises the following steps.

(1) A dispersion step, in which pore-forming-treated carbon powder with an average particle size of less than 100 nm and a fibrous carbon are dispersed into a solvent.

(2) A sheet electrode forming step, in which a carbon powder/fibrous carbon sheet is formed by removing the solvent from a solution obtained in the dispersion step.

According to the present invention, internal resistance can be lowered in the electrode obtained by removing the solvent from the solution in which the carbon powder and the fibrous carbon are mixed, so that a superior electrode with low electric resistance and an electric double-layer capacitor using the electrode can be obtained.

DESCRIPTION OF EMBODIMENTS

Hereinafter, the embodiments for carrying out the present invention will be described. It is noted that the present invention is not to be limited to the embodiments described below.

Figure 1:
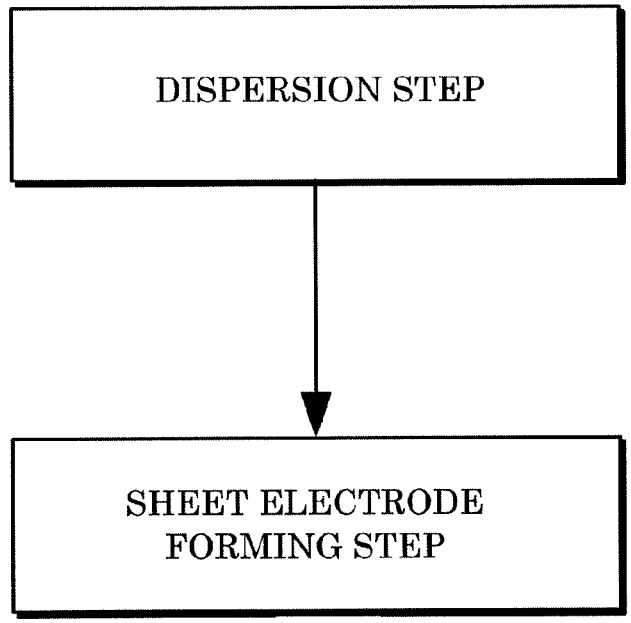
FIG. 1 is a flowchart illustrating a manufacturing process of an electrode according to the present embodiment.

As shown in FIG. 1, an electrode of the present embodiments is manufactured in the following steps (1) and (2).

(1) A dispersion step, in which carbon powder and a fibrous carbon are dispersed into a solvent.

(2) A sheet electrode forming step, in which a carbon powder/fibrous carbon sheet electrode is formed by removing the solvent from a solution obtained in the above-mentioned dispersion step.

Hereinafter, the steps (1) and (2) will be described in detail.

(1) Dispersion Step

In the dispersion step, carbon powder and a fibrous carbon are dispersed into a solvent.

The carbon powder used in the present embodiments expresses main capacitance of the electrode. Types of the carbon powder include activated carbon using a material derived from natural plant tissue such as coconut shell, synthetic resin such as phenol, and fossil fuel such as coal, coke, and pitch, as a raw material; carbon black such as Ketjen Black (hereinafter, "KB"), acetylene black, and channel black; carbon nanohorn; amorphous carbon; natural graphite; artificial graphite; graphitized Ketjen Black; activated carbon; mesoporous carbon; and the like.

Moreover, it is preferable that the carbon powder is subjected to pore forming treatment, such as activating treatment and opening treatment, prior to use. As a method for activating the carbon powder, activating treatment conventionally known, such as gas activation method and chemical activation method, can be commonly used, but varies depending on the raw material to be used. Gas used in the gas activation method includes vapor, air, carbon monoxide, carbon dioxide, hydrogen chloride, oxygen, or gas comprising a mixture thereof. Also, a chemical agent used in the chemical activation method includes a hydroxide of alkali metal such as sodium hydroxide and potassium hydroxide; a hydroxide of alkaline earth metal such as calcium hydroxide; inorganic acids such as boric acid, phosphoric acid, sulfuric acid, and hydrochloric acid; inorganic salts such as zinc chloride, or the like. In the activating treatment, the carbon powder is subjected to heating treatment as necessary. Note that the opening treatment in which pores are formed in the carbon powder may be also used other than the activating treatments.

Moreover, a specific surface area of the carbon powder is desirably within a range of 600 to 2000 $m^2/g$. An average particle diameter of primary particles of the carbon powder is desirably less than 100 nm, and especially desirably less than 50 nm. When the average particle diameter of the carbon powder is less than 100 nm, the carbon powder has low diffusion resistance and high electrical conductivity owing to its extremely small particle diameter. Moreover, high capacitance expression effect can be expected owing to its large specific surface area by the pore forming treatment. When the average particle diameter of the carbon powder is more than 100 nm, ion diffusion resistance in particles of the carbon powder is high, so that resistance of the resulting capacitor is accordingly high. On the other hand, in light of an agglomeration state of the carbon powder, the average particle diameter is preferably 5 nm or more. Note that, a form in which the extremely small carbon powder with the average particle diameter of less than 100 nm is individually connected in series like beads on a string increases the electrical conductivity. The carbon powder comprises especially preferably activated carbon black. Moreover, even when the average particle diameter of the carbon powder is less than 10 μm, the effect of the present invention can be developed by ultracentrifuging treatment and treatment by jet mixing which are described below as a dispersion method.

Moreover, the electrical conductivity of the carbon powder is preferably within a range of 20 to 1000 S/cm. Such high electrical conductivity can further lower the resistance of the obtained electrode. In a method for evaluating the conductivity of the carbon powder, the following electrical conductivity in compression is measured. The electrical conductivity in compression is a value calculated by: sandwiching the carbon powder between electrodes with a cross-sectional area A ($cm^2$); then compressing by applying constant load and holding the carbon powder sandwiched between the electrodes, wherein the compressed carbon powder having a thickness of h (cm); applying a voltage to both ends of the electrodes and measuring an electric current so as to determine resistance R (Ω) of the compressed carbon powder; and then calculating the electrical conductivity using the following formula (1).

Electrical conductivity in compression$(S/cm) = h/(A*R)$  Formula (1)

In the formula (1), A is the cross-sectional area ($cm^2$) of the electrodes; h is the thickness (cm) when the carbon powder is sandwiched between the electrodes and then compressed by applying the constant load until volume does not change and held: and R is the resistance (Ω) of the compressed carbon powder.

Note that the weight of the carbon material used for the measurement may be an amount which can be compressed and held between the electrodes, and the load in the compression may be set to a degree that a shape of the carbon powder will not be destructed and the volume of the carbon powder will not be changed.

Moreover, when the average particle diameter of the carbon powder is less than 100 nm, the percentage of mesopores (diameter: 2 to 50 nm) among pores in the carbon powder is preferably within a range of 5 to 55%. When the percentage of the mesopores is less than 5%, reduction in the resistance is hardly expected, whereas when the percentage of the mesopores is more than 55%, the electrode is hardly manufactured. In the general activated carbon, the percentage of micropores (diameter: less than 2 nm) is 95% or more, while in the carbon powder with the average particle diameter of less than 100 nm, the percentage of the mesopores (diameter: 2 to 50 nm) and macropores (diameter: more than 50 nm) is relatively large.

In the general activated carbon, in order to enlarge a surface area, large particles with the average particle diameter of several microns are used and a number of small diameters (micropores) are provided. A large number of pores are provided inside the particles. An inner surface area of the particles is about 80% (specific surface area) with respect to the whole area of the particles. Ions in an electrolytic solution have to enter a depth of the pores inside the particles and thus the diffusion resistance tends to be high, so that the activated carbon hardly lowers the resistance.

In contrast, when the average particle diameter of the carbon powder is less than 100 nm, owing to its extremely small diameters, a distance to the depth of the pores inside the particles is short and thus the ions in the electrolytic solution easily move. Therefore, the diffusion resistance is low and the electrical conductivity of the carbon powder is high. Moreover, the specific surface area is enlarged by the pore forming treatment. In particular, by increasing the percentage of relatively large pores (mesopores) with small particle diameter to 5 to 55% as described above, the ions are made easier to move, and thus the diffusion resistance can be further lowered.

The fibrous carbon used in the present embodiment can effectively entwine the extremely small nanosize carbon powder between fibers, and serves like a binder when molding in a papermaking manner. Types of the fibrous carbon include carbon nanotube (hereinafter, "CNT"), carbon nanofiber (hereinafter, "CNF"), and the like. Note that, for the fibrous carbon, the activating treatment and the opening treatment forming pores in tips and walls of the fibrous carbon may also be used.

The CNT used as the fibrous carbon may be single-walled carbon nanotube in which a graphene sheet is a monolayer, multi-walled carbon nanotube (MWCNT) in which the graphene sheets having two or more layers are coaxially rounded and tube walls form multilayers, or a mixture thereof. Moreover, specific capacity of the CNT itself becomes higher as the number of the graphene sheet layers in the CNT becomes lower, so that the CNT with the number of the layers within a range of 50 or less, preferably 10 or less, is preferable from the view point of the specific capacity.

An external diameter of the fibrous carbon is within a range of 1 to 100 nm, preferably 2 to 70 nm, more desirably 3 to 40 nm. Moreover, a length of the fibrous carbon is within a range of 50 to 1000 μm, preferably 70 to 500 μm, more preferably 100 to 200 μm.

Moreover, a specific surface area of the fibrous carbon is desirably within a range of 100 to 2600 $m^2/g$, preferably 200 to 2000 $m^2/g$. When the specific surface area is larger than 2600 $m^2/g$, the formed sheet electrode easily expands, whereas when it is lower than 100 $m^2/g$, desired electrode density is hardly increased.

Note that the particle diameter and a figure of the carbon powder and the fibrous carbon were measured by ASTM D3849-04 (also called ASTM particle size).

Regarding the contents of the carbon powder and the fibrous carbon, the fibrous carbon is contained preferably at 5 to 50% by weight, particularly preferably at 10 to 30% by weight with respect to the total amount of the carbon powder and the fibrous carbon. When the content of the fibrous carbon is more than 50% by weight, the electrode itself expands at the time of impregnation with the electrolytic solution, an outer case is pressed and thus the case easily expands. On the other hand, when the content of the fibrous carbon is less than 5% by weight, an aggregate of the carbon powder is large and thus internal resistance tends to increase. Note that any other components may be contained within a range without impairing the object of the present invention. For example, the component includes a dispersing agent, other binders and the like.

As the solvent into which the carbon powder and the fibrous carbon are dispersed in the present embodiment, alcohol such as methanol, ethanol or 2-propanol; a hydrocarbon-based solvent; an aromatic solvent; an amide-based solvent such as N-methyl-2-pyrrolidone (NMP) or N,N-dimethylformamide (DMF); water; or any type of solvents such as those using only one of the above-mentioned solvents or a mixture of two or more of them can be used. Moreover, an additive such as a dispersing agent may be added to the solvent.

In the dispersion step of the present embodiment, the carbon powder and the fibrous carbon are added into the solvent, and then dispersion treatment is applied to the mixed solution. By applying the dispersion treatment, the carbon powder and the fibrous carbon in the mixed solution are subdivided and homogenized, and thus dispersed into the solution. In other words, the fibrous carbon in the mixed solution before the dispersion treatment is in a state that the carbon fibers are entwined with each other (bundle state). By applying the dispersion treatment, the bundles of the fibrous carbon are loosened, so that the fibrous carbon is dispersed into the solution. As the dispersion method, a mixer, jet mixing (jet collision), ultracentrifuging treatment, other ultrasonic treatments, or the like is used. Among them, in consideration for highly dispersing the carbon powder and the fibrous carbon as well as improving the electrode density of the obtained sheet electrode, jet mixing or ultracentrifuging treatment is preferable as the dispersion method. By using such jet mixing or ultracentrifuging treatment, the aggregates of the carbon material are subdivided and the agglomeration of the carbon material with the extremely small particle diameter is suppressed, and thus the electrode with low internal resistance can be obtained.

In the dispersion method by using the mixer, physical force is applied to the mixed solution containing the carbon powder and the fibrous carbon by a bead mill, a rod mill, a roller mill, an agitation mill, a planetary mill, a vibration mill, a ball mill, a homogenizer, a homo mixer or the like to subdivide the carbon powder and the fibrous carbon in the solution by agitation. By applying external force to the carbon powder, the agglomerated carbon powder is subdivided and homogenized and the fibrous carbon entwined with each other can be loosened. Above all, the planetary mill, the vibration mill, or the ball mill which can provide crushing force is preferable.

In the dispersion method by using the jet mixing, a pair of nozzles is provided in positions facing each other on inner walls of a tubular chamber. The mixed solution containing the carbon powder and the fibrous carbon is pressurized by a high-pressure pump, injected from the pair of nozzles, and allowed to collide head-on in the chamber. Thereby, the bundles of the fibrous carbon are crushed, and can be dispersed and homogenized. As conditions of the jet mixing, it is preferable that pressure is 100 MPa or more and that a concentration is less than 5 g/l.

In the dispersion method by using the ultracentrifuging treatment, the ultracentrifuging treatment is applied to the mixed solution containing the carbon powder and the fibrous carbon. In the ultracentrifuging treatment, shear stress and centrifugal force are applied to the carbon powder and the fibrous carbon of the mixed solution in a rotating container.

For example, the ultracentrifuging treatment can be applied by using a container which consists of an outer drum having a cover plate at an opening thereof and a rotatable inner drum having through-holes. The mixed solution is introduced inside the inner drum of the container. By rotating the inner drum, the carbon powder and the fibrous carbon inside the inner drum are transferred to an inner wall of the outer drum passing through the through-holes of the inner drum owing to the centrifugal force. At this time, the carbon powder and the fibrous carbon collide against the inner wall of the outer drum owing to the centrifugal force of the inner drum, and slide up to an upper portion of the inner wall in a thin film state. In this state, the shear stress with the inner wall and the centrifugal force from the inner drum are both simultaneously applied to the carbon powder and the fibrous carbon, and thus a large mechanical energy is applied to the carbon powder and the fibrous carbon in the mixed solution.

In the ultracentrifuging treatment, both mechanical energies from the shear stress and the centrifugal force are simultaneously applied to the carbon powder and the fibrous carbon in the mixed solution, so that the mechanical energies homogenize and subdivide the carbon powder and the fibrous carbon in the mixed solution.

Note that, although the dispersion treatment is preferably applied to the mixed solution in which the carbon powder and the fibrous carbon are mixed, a solution into which the fibrous carbon is separately introduced may be prepared before the dispersion treatment is applied to the solution to obtain the fibrous carbon with the bundles loosened and then the fibrous carbon and the carbon powder may be mixed to obtain the mixed solution. Alternatively, a solution into which the carbon powder is separately introduced may be prepared before the dispersion treatment is applied to the solution to obtain the subdivided carbon powder, and then the carbon powder and the fibrous carbon may be mixed to obtain the mixed solution. Furthermore, a solution into which the fibrous carbon is separately introduced may be prepared before the dispersion treatment is applied to the solution to obtain the fibrous carbon with the bundles loosened, and similarly a solution into which the carbon powder is separately introduced may be prepared before the dispersion treatment is applied to the solution to obtain the subdivided carbon powder, and then the fibrous carbon and the carbon powder may be mixed to obtain the mixed solution. Also to these mixed solutions, the dispersion treatment is preferably applied.

Moreover, the sheet electrode may contain various additives and the like. For example, the additives include a solid acid such as amorphous silica alumina and amorphous silica magnesia, a gas absorbent, and the like.

(2) Sheet Electrode Forming Step

In the sheet electrode forming step, the carbon powder/fibrous carbon sheet electrode is obtained by removing the solvent from the mixed solution subjected to the dispersion step. As a method for removing the solvent from the mixed solution, a method for filtering the mixed solution including paper-molding, or the like can be utilized.

In the paper-molding, which is an example of the method for removing the solvent from the mixed solution, the mixed solution is vacuum filtered and dried by using a filter paper such as non-woven fabric of glass fiber, organic non-woven fabric (polytetrafluoroethylene, polyethylene or the like) or non-woven fabric of metal fiber, so that the solvent in the mixed solution is removed to obtain the sheet electrode of the carbon powder/fibrous carbon. The sheet electrode is obtained by accumulating the carbon powder and the fibrous carbon on the filter paper. In the sheet electrode, intervals between the fibrous carbon are 2 μm or less. The carbon powder is dispersed among the fibrous carbon with the intervals of 2 μm or less and supported by the fibrous carbon. It is preferable that the sheet electrode is peeled off from the filter paper for use.

Figure 2:
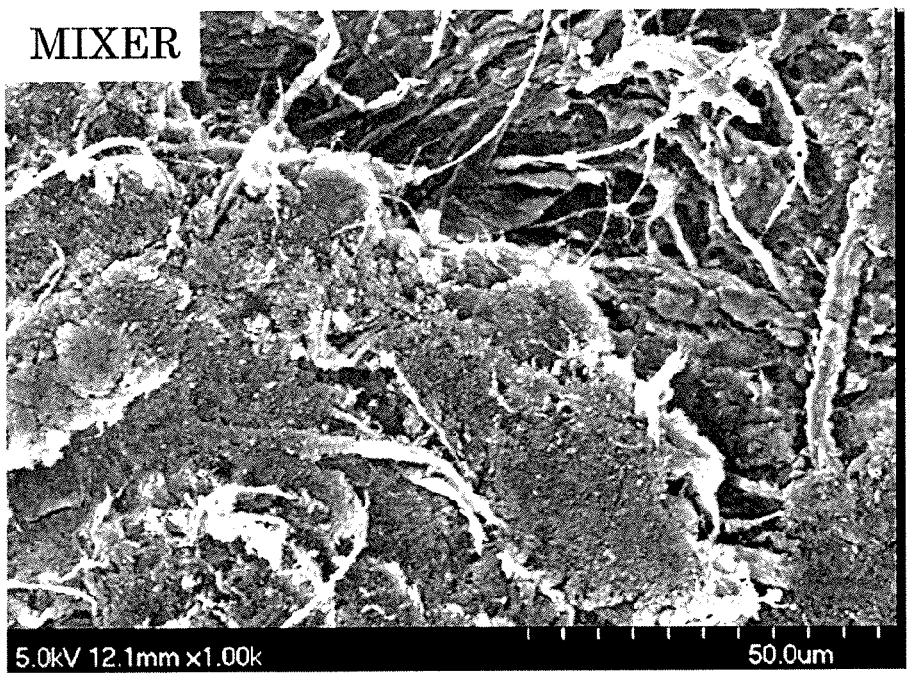
FIG. 2 is an SEM (*1.00 k) image of a carbon powder/fibrous carbon sheet made from a solution in which carbon powder and a fibrous carbon are dispersed by using a mixer.
Figure 3:
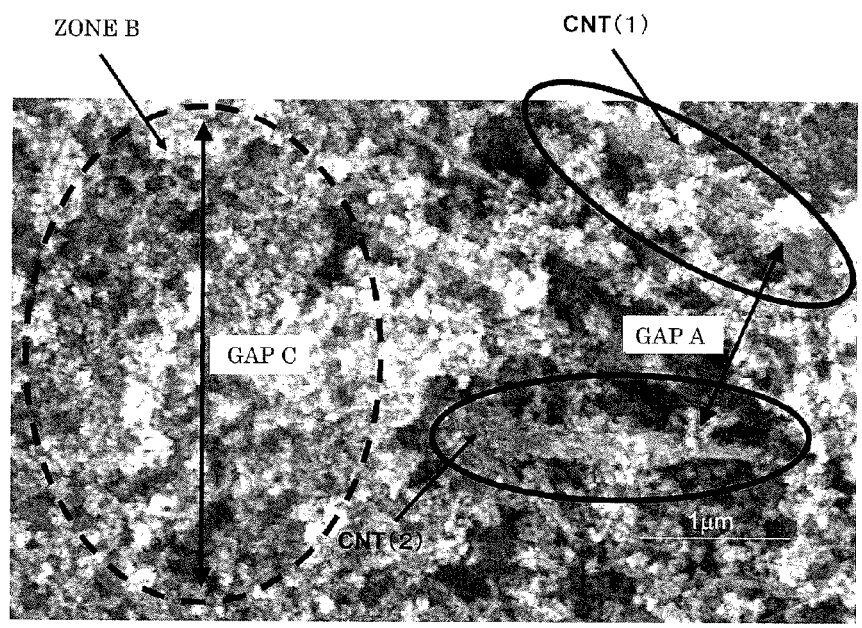
FIG. 3 is an SEM (*4.00 k) image of the carbon powder/fibrous carbon sheet made from the solution in which the carbon powder and the fibrous carbon are dispersed by using the mixer.

FIG. 2 is an SEM (*1.00 k) image of a carbon powder/fibrous carbon sheet electrode made from the solution in which the carbon powder (carbon black) and the fibrous carbon (CNT) are dispersed by using the mixer in the dispersion step, and FIG. 3 is an SEM (*4.00 k) image of this carbon powder/fibrous carbon sheet electrode.

Figure 4:
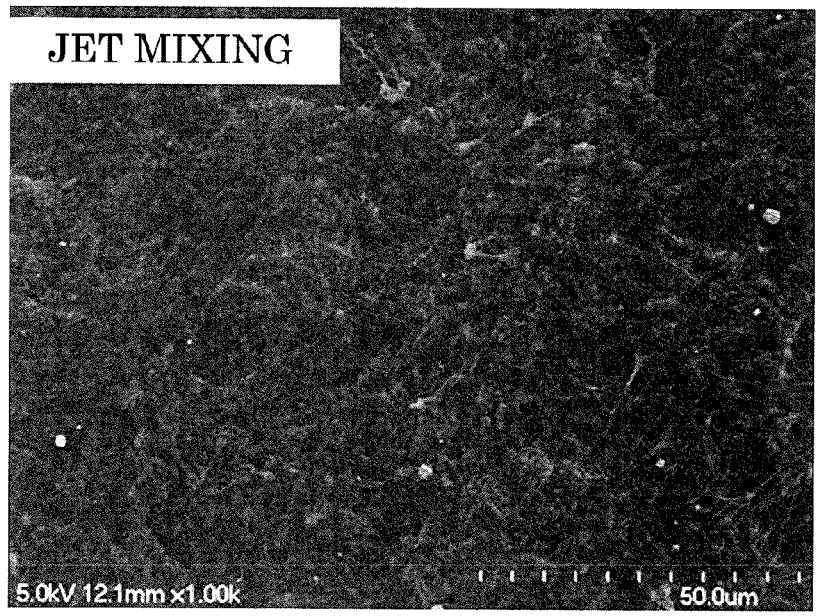
FIG. 4 is an SEM (*1.00 k) image of a carbon powder/fibrous carbon sheet made from a solution in which the carbon powder and the fibrous carbon are highly dispersed by using jet mixing.
Figure 5:
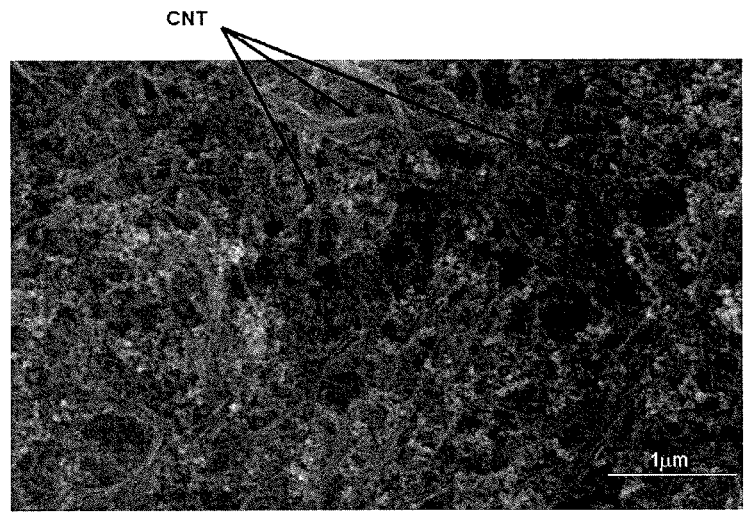
FIG. 5 is an SEM (*4.00 k) image of the carbon powder/fibrous carbon sheet made from the solution in which the carbon powder and the fibrous carbon are highly dispersed by using the jet mixing.

FIG. 4 is an SEM (*1.00 k) image of a carbon powder/fibrous carbon sheet electrode made from the solution in which the carbon powder (carbon black) and the fibrous carbon (CNT) are highly dispersed by using the jet mixing, and FIG. 5 is an SEM (*4.00 k) image of this carbon powder/fibrous carbon sheet electrode.

Figure 6:
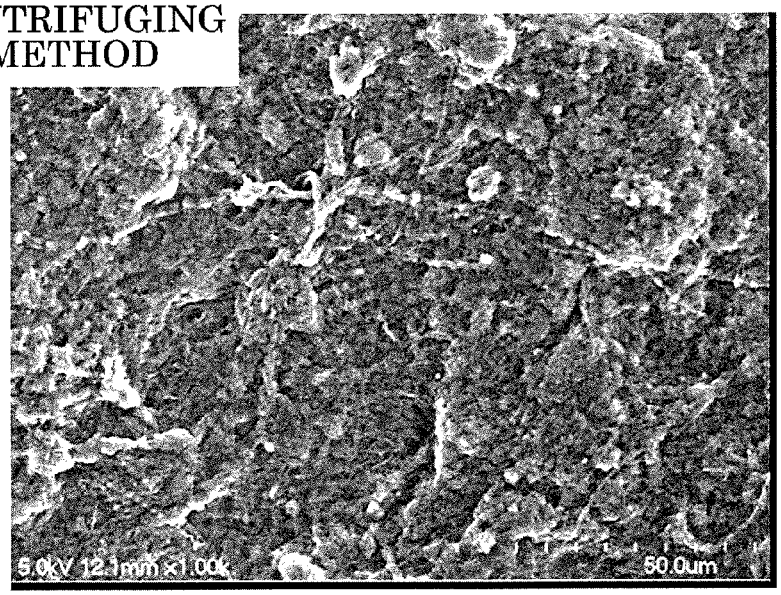
FIG. 6 is an SEM (*1.00 k) image of a carbon powder/fibrous carbon sheet made from a solution in which the carbon powder and the fibrous carbon are highly dispersed by using ultracentrifuging treatment.
Figure 7:
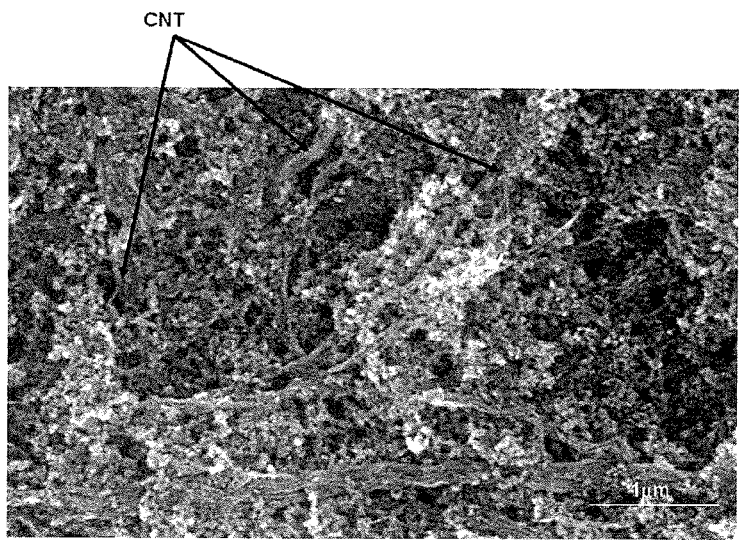
FIG. 7 is an SEM (*4.00 k) image of the carbon powder/fibrous carbon sheet made from the solution in which the carbon powder and the fibrous carbon are highly dispersed by using the ultracentrifuging treatment.

FIG. 6 is an SEM (*1.00 k) image of a carbon powder/fibrous carbon sheet electrode made from the solution in which the carbon powder (carbon black) and the fibrous carbon (CNT) are highly dispersed by using the ultracentrifuging treatment, and FIG. 7 is an SEM (*4.00 k) image of this carbon powder/fibrous carbon sheet electrode.

Figure 8:
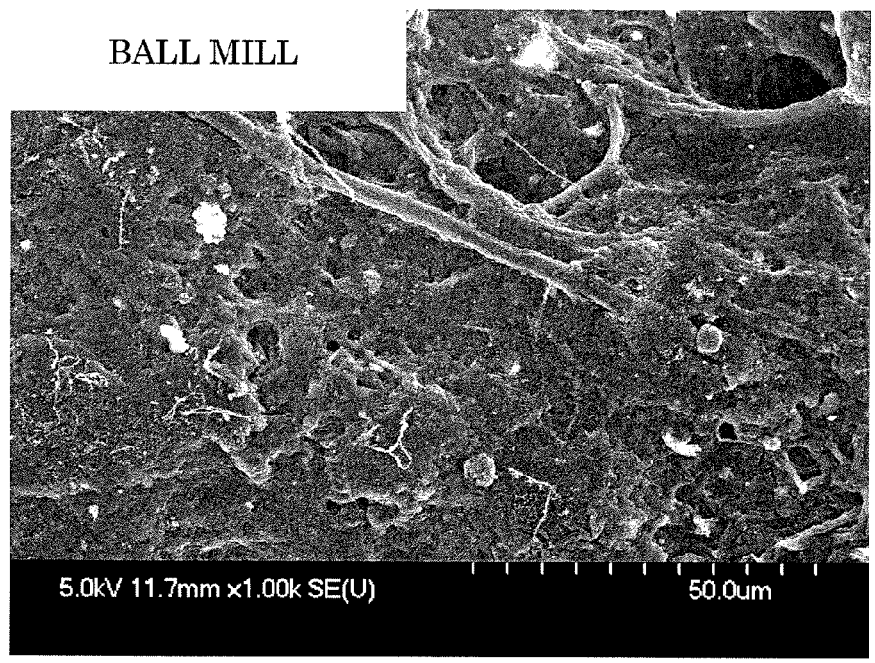
FIG. 8 an SEM (*1.00 k) image of a carbon powder/fibrous carbon sheet made from a solution in which the carbon powder and the fibrous carbon are highly dispersed by using a ball mill.
Figure 9:
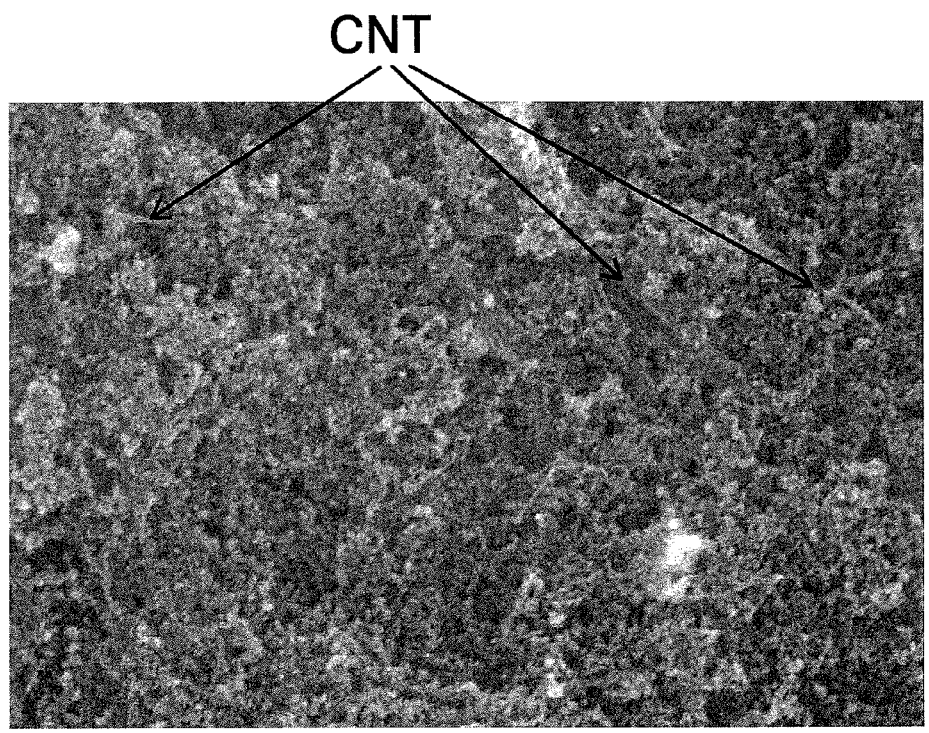
FIG. 9 is an SEM (*4.00 k) image of the carbon powder/fibrous carbon sheet made from the solution in which the carbon powder and the fibrous carbon are highly dispersed by using the ball mill.

FIG. 8 is an SEM (*1.00 k) image of a carbon powder/fibrous carbon sheet electrode made from the solution in which the carbon powder (carbon black) and the fibrous carbon (CNT) are highly dispersed by using the ball mill, and FIG. 9 is an SEM (*4.00 k) image of this carbon powder/fibrous carbon sheet electrode.

As shown in FIGS. 2, 4, 6 and 8, in the carbon powder/fibrous carbon sheet electrodes, the fibrous carbon entwines and supports the carbon powder. It is shown that surface shapes of the sheet electrodes become denser from the carbon powder/fibrous carbon sheet electrode made from the mixed solution to which the dispersion treatment is applied by using the mixer toward the carbon powder/fibrous carbon sheet electrode made from the mixed solution to which the dispersion treatment is applied by using the ball mill, the carbon powder/fibrous carbon sheet electrode made from the mixed solution to which the dispersion treatment is applied by using the jet mixing, and the carbon powder/fibrous carbon sheet electrode made from the mixed solution to which the dispersion treatment is applied by using the ultracentrifuging treatment.

Moreover, as shown in FIG. 3, in the carbon powder/fibrous carbon sheet electrode made from the solution to which the dispersion treatment is applied by using the mixer (homogenizer), the fibrous carbon (CNT) is sparse and intervals between the fibrous carbon (CNTs) are wide. That is, in the dispersion treatment by using the mixer, since the loosened bundles of the fibrous carbon (CNTs) in the bundle state are few, the fibrous carbon (CNT) is sparse and gaps between the CNTs are large. Therefore, the carbon powder is hardly dispersed uniformly and supported by the fibrous carbon.

In FIG. 3, there are parts in which distances between the CNTs are short, such as a gap A between CNT (1) and CNT (2), while there are zones where the CNT is not observed in the SEM image such as a zone B. In such a zone B, a gap C between CNTs often exceeds 2 μm. In other words, it is shown that the CNTs are not sufficiently dispersed and sparse. Moreover, the carbon powder is also not sufficiently subdivided and the aggregates of the carbon powder have a size of more than 3 μm. Since the carbon powder which is the large aggregates is supported by the sparse CNT, the carbon powder is not uniformly dispersed and supported by the CNT, thereby inviting difficulty of improving an electrode capacitance and the internal resistance. Note that the gap between the CNTs in the zone B was observed in the SEM image and calculated as a maximum direct distance in the zone where the CNTs did not exist.

On the other hand, as shown in FIGS. 5, 7, and 9, in the carbon powder/fibrous carbon sheet electrode made from the solution to which the dispersion treatment is applied by using the jet mixing, the ultracentrifuging treatment, or the ball mill, the fibrous carbon (CNT) is dense and the intervals between the fibrous carbon (CNTs) are narrow. That is, in the dispersion treatment by using the jet mixing, the ultracentrifuging treatment, or the ball mill, since the bundles of the fibrous carbon (CNTs) in the bundle state are sufficiently loosened, a netlike shape of the fibrous carbon (CNT) is made dense. Moreover, an aggregated state of the carbon powder is collapsed by the dispersion treatment using the jet mixing, the ultracentrifuging treatment, or the ball mill, and the carbon powder itself is also subdivided into the smaller aggregates. In the dense netlike-shaped fibrous carbon, the carbon powder is supported thereby in a subdivided aggregate state, and the carbon powder and the fibrous carbon are dispersed uniformly.

In FIGS. 5, 7, and 9, gaps between the CNTs are 2 μm or less, and a gap of more than 2 μm could not be observed. The carbon powder (carbon black) is dispersed and supported by the netlike-shaped fibrous carbon (CNT) as the small aggregates with a size of 3 μm or less, so that the carbon powder can be highly dispersed.

Note that, by observing randomly photographed SEM images of each sheet electrode at three positions under the same conditions as FIG. 2 to FIG. 9, it was confirmed that the forms as described above could be obtained in any image.

In these sheet electrodes, such sheet electrode is made by the filtration of the mixed solution containing the fibrous carbon which serves like a binder, so that an addition amount of a resin-based binder can be suppressed to lower the resistance Furthermore, the average particle diameter of the carbon powder is made extremely small, less than 100 nm, so that the diffusion resistance of the carbon powder itself can be lowered, and thus the resistance of the sheet electrode can be further lowered. Moreover, since the carbon powder with extremely small particle diameter is used, the carbon powder tends to be easily agglomerated and the obtained sheet electrode tends to have lower density. However, the carbon powder and the fibrous carbon in the mixed solution are highly dispersed by using dispersion technique such as the jet mixing or the ultracentrifuging treatment, so that the electrode density is increased by making the sheet electrode a dense and homogeneous form, and thus a superior sheet electrode which can obtain the same level of capacitance as that of the conventional electrode using micron size carbon powder can be realized.

The carbon powder/fibrous carbon sheet electrode made in the sheet electrode forming step is cut into the same size as a current collector and placed on top of an etched aluminum foil which will be the current collector. The foil and the sheet electrode are pressed from upper and lower directions. The foil and the sheet electrode are unified by allowing the sheet electrode to bite into an uneven surface of the aluminum foil so as to make the electrode. The current collector is not limited to the aluminum foil, but conductive materials such as platinum, gold, nickel, titanium, steel and carbon can also be used. As a shape of the current collector, any shape including film, foil, plate, reticulation, expanded metal, cylinder, and the like can be adopted. Moreover, the surface of the current collector may be formed as the uneven surface by the etching treatment and the like, or may be a plane surface.

On the surface of the current collector, a phosphoric acid-based coating, a non-insulating oxide film or the like may be formed. The phosphoric acid-based coating can be formed by treating the surface of the current collector with a phosphoric acid aqueous solution. Also, for the non-insulating oxide film, a deposition film of an inorganic oxide such as silicon oxide is formed by using a thermal chemical vapor deposition method or the like. The non-insulating oxide film includes oxide films comprising silicon oxide, tantalum oxide, niobium oxide, hafnium oxide, zirconium oxide, titanium oxide, or the like, though, the oxide film comprising silicon oxide is more preferable among them. Insulating property of these oxide films is low and hardly affects electrical characteristics of the current collector.

For the unification of the sheet electrode and the current collector, the above-mentioned pressing may be used, or an undercoat layer with a conductive adhesive (for example, a carbon material or the like is used) or the like may be used. Note that the carbon powder/fibrous carbon sheet electrode may be subjected to flattening treatment, e.g. to pressing before the unification with the current collector as necessary.

Next, a state of the sheet electrode will be discussed. For the carbon powder/fibrous carbon sheet electrode made by filtering and drying the mixed solution in which the carbon material and the fibrous carbon were dispersed, a particle size distribution when the sheet electrode was dispersed to a prescribed solution (50% cumulative particle diameter: D50 [median particle size], 90% cumulative particle diameter: D90) was studied. As a result, the so-called normal distribution with a single peak was shown. It was found that structure with D90/D50 in the particle size distribution of 2.5 or less was preferable. In other words, the carbon powder/fibrous carbon sheet electrode within this range has a uniform surface state and high density. Moreover, by setting the D90 to less than 110 μm, a sharp particle size distribution is obtained, and the carbon powder/fibrous carbon sheet electrode with the uniform surface state and high density can be obtained. A lower limit of the D90 is 1 μm or more, and an optimal range is 1 to 50 μm. Note that the particle size distribution was measured in a state that the carbon powder/fibrous carbon sheet electrode (1 cm$^2$) was introduced into an isopropyl alcohol (IPA) solution and dispersed with the homogenizer (24000 rpm, 5 minutes) (Measurement method of particle size distribution).

Figure 10:
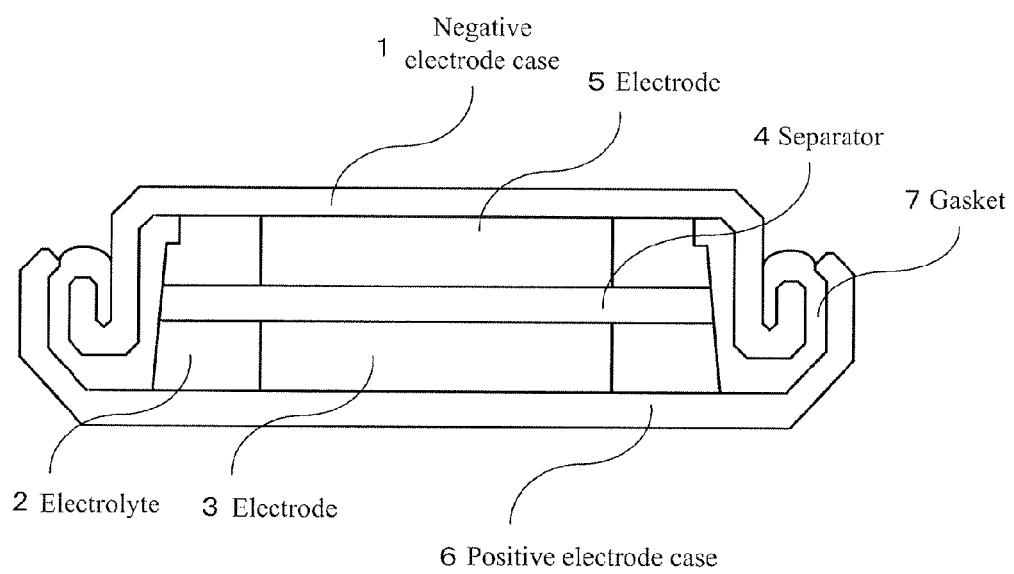
FIG. 10 is a cross-sectional view of a coin-type electric double-layer capacitor according to the present embodiment.

FIG. 10 illustrates, as an example of an electric double-layer capacitor, a cross-sectional view of a coin-type electric double-layer capacitor in which the sheet electrode using the carbon powder/fibrous carbon is applied to a coin cell. The coin-type electric double-layer capacitor consists of a negative electrode case 1, an electrolyte 2, an electrode 3, a separator 4, an electrode 5, a positive electrode case 6, and a gasket 7.

The electrode 3 and the electrode 5 are the carbon powder/fibrous carbon sheet electrodes of the present embodiment. The sheet electrode 3 and the sheet electrode 5 are fixed and electrically coupled to the negative electrode case 1 serving as a negative electrode collector and the positive electrode case 6 serving as a positive electrode collector, for example by the undercoat layer using e.g. a conductive resin adhesive, press pressing or the like.

The negative electrode case 1 is made by drawing a stainless steel plate whose outward surface is plated with Ni, serving as a negative electrode terminal (negative electrode collector). Also, the positive electrode case 6 is made of stainless steel, valve action metal such as Al or Ti, or the like whose outward surface, which will be a cell case body, is plated with Ni, serving as a positive electrode terminal (positive electrode collector).

As the negative electrode case 1 and the positive electrode case 6, Mo-containing stainless steel such as SUS316, 316L, or two-layered stainless, or the valve action metal such as Al or Ti can be preferably used owing to their high corrosion resistance. Moreover, it is particularly preferable that a clad material in which the stainless steel and the valve action metal such as Al or Ti are attached by press-joining with cold rolling or the like is used with the valve action metal side as an inward surface of the cell. By this, the corrosion resistance during high voltage application becomes high, and mechanical strength when sealed becomes high and hence the cell with high sealing reliability is obtained.

Note that, as the negative electrode case 1 and the positive electrode case 6, the materials described for the above-mentioned current collector may be used and the form thereof may be also applied.

As the separator 4, a cellulose-based separator, a synthetic fiber non-woven fabric-based separator, a mixed separator in which the cellulose and the synthetic fiber are mixed, or the like can be used. Non-woven fabric made of polyester, polyphenylene sulphide, polyethylene terephthalate, polybutylene terephthalate, polyamide, polyimide, fluororesin, polyolefin-based resin such as polypropylene and polyethylene, ceramics, glass or the like; kraft paper; Manila paper; esparto paper; mixed paper of them; porous film, or the like can be preferably used. If reflow soldering is performed, the resin with a heat deformation temperature of 230° C. or more is used. For example, polyphenylene sulfide, polyethylene terephthalate, polyamide, fluororesin, ceramics, glass, or the like can be used.

As the electrolyte 2 impregnated into the electrode 3, the electrode 5, and the separator 4, ethylene carbonate, propylene carbonate, vinylene carbonate, butylene carbonate, dimethyl carbonate, ethyl methyl carbonate, diethyl carbonate, chain sulfones such as ethyl isopropyl sulfone, ethyl methyl sulfone, ethyl isobutyl sulfone or the like, sulfolane, 3-methyl sulfolane, γ-butyrolactone, acetonitrile, 1,2-dimethoxyethane, N-methylpyrrolidone, dimethylformamide, dimethyl sulfoxide, tetrahydrofuran, 2-methyltetrahydrofuran, 1,3-dioxolane, nitromethane, ethylene glycol, ethylene glycol dimethyl ether, ethylene glycol diethyl ether, water or a mixture of them can be used. In particular, when the mixture of sulfolane and a sulfolane compound, which has a side chain on a sulfolane skeleton, or the chain sulfone is used as a solvent in the electrolyte 2, influence over time to the electrode capacitance of the electric double-layer capacitor can be reduced. The sulfolane compound has cyclic sulfone structure of tetrahydrothiophene-1,1-dioxide and, for example, is a compound having a side chain of an alkyl group on the sulfolane skeleton such as sulfolane, 3-methylsulfolane or the like, or a mixture thereof. The chain sulfone has chain structure in which two alkyl groups are bonded to a sulphonyl group, and, for example, includes ethyl isopropyl sulfone, ethyl methyl sulfone, ethyl isobutyl sulfone, and the like.

Moreover, in the electrolyte, one or more electrolytes selected from a group consisting of a quaternary ammonium salt or a lithium salt are contained. Any quaternary ammonium salt or lithium salt can be used, as long as it is an electrolyte which can generate a quaternary ammonium ion or a lithium ion. It is more preferable that one or more electrolytes selected from a group consisting of the quaternary ammonium salt and the lithium salt are used. In particular, ethyltrimethylammonium $BF_4$, diethyldimethylammonium $BF_4$, triethylmethylammonium $BF_4$, tetraethylammonium $BF_4$, spiro-(N,N')-bipyrrolidinium $BF_4$, ethyltrimethylammonium $PF_6$, diethyldimethylammonium $PF_6$, triethylmethylammonium $PF_6$, tetraethylammonium $PF_6$, spiro-(N,N')-bipyrrolidinium $PF_6$, tetramethylammonium bis(oxalato)borate, ethyltrimethylammonium bis(oxalato)borate, diethyldimethylammonium bis(oxalato)borate, triethylmethylammonium bis(oxalato)borate, tetraethylammonium bis(oxalato)borate, Spiro-(N,N')-bipyrrolidinium bis(oxalato)borate, tetramethylammonium difluorooxalatoborate, ethyltrimethylammonium difluorooxalatoborate, diethyldimethylammonium difluorooxalatoborate, triethylmethylammonium difluorooxalatoborate, tetraethylammonium difluorooxalatoborate, Spiro-(N,N')-bipyrrolidinium difluorooxalatoborate, $LiBF_4$, $LiPF_6$, lithium bis(oxalato)borate, lithium difluorooxalatoborate, methylethylpyrrolidinium tetrafluoroborate, or the like is preferred.

Moreover, in the electrolyte, various additives may be contained. The additives include phosphoric acids and derivatives thereof (phosphoric acid, phosphorous acid, phosphoric acid esters, phosphonic acids and the like), boric acids and derivatives thereof (boric acid, boron oxide, boric acid esters, a complex of boron and a compound with a hydroxyl group and/or a carboxyl group, and the like), nitrates (lithium nitrate and the like), nitro compounds (nitrobenzoic acid, nitrophenol, nitrophenetole, nitroacetophenone, an aromatic nitro compound, and the like), and the like. A content of the additive is, from a viewpoint of conductivity, preferably 10% by weight or less, and more preferably 5% by weight or less with respect to the whole weight of the electrolyte.

Moreover, in the electrolyte, the gas absorbent may be contained. The absorbent of gas generated from the electrode is not particularly limited, as long as it does not react with and remove (adsorb or the like) each component (the solvent, electrolyte salts, various additives, or the like) of the electrolyte. Examples of the absorbent include zeolite, silica gel, and the like.

The gasket 7 is mainly composed of a resin having insolubility and corrosion resistance with respect to the electrolyte 2 as well as electrical insulating property. The gasket 7 is interposed between the negative electrode case 1 and the positive electrode case 6 to keep electrical insulating property between a negative electrode and a positive electrode, while by folding caulking a peripheral edge part of the positive electrode case inward, the gasket 7 hermetically seals cell contents.

As the gasket 7, the resin such as polypropylene, nylon, and the like is ordinarily used, but if the reflow soldering is performed, the resin with the heat deformation temperature of 230° C. or more is used. For example, polyphenylene sulfide, polyethylene terephthalate, polyamide, liquid crystal polymer (LCP), tetrafluoroethylene-perfluoroalkylvinylether copolymer resin (PFA), polyether ether ketone resin (PEEK), polyether nitrile resin (PEN), moreover, polyether ketone resin (PEK), polyarylate resin, polybutylene terephthalate resin, polycyclohexanedimethylene terephthalate resin, polyether sulfone resin, polyamino bismaleimide resin, polyetherimide resin, fluororesin, or the like can be used. Moreover, a gasket in which the glass fiber, mica whisker, ceramic fine powder, and the like are added to these materials in an addition amount of about 30% by weight or less can be preferably used.

(3) Electrode Density of the Electrode

In the electrode according to the present invention, good results are obtained regarding the electrode capacitance by setting the electrode density to 0.48 g/cc or more.

Note that, "Electrode density" described herein is a mass per unit volume of the sheet electrode obtained by filtering the carbon powder and the fibrous carbon. Specifically, it is a value calculated by dividing weight of a solid content including electrode materials by its volume, in a thickness region (the volume) of the sheet electrode with the area of 1 cm$^2$.

(4) Application Embodiments of the Electrode According to the Present Invention

The electrode and the manufacturing method of the electrode according to present invention can be applied not only to the electric double-layer capacitor but also to an electricity storage device such as various capacitors and secondary batteries, for example an electrochemical capacitor including a lithium ion capacitor and the like.

Moreover, the electrode and the manufacturing method of the electrode according to present invention may be applied not only to the coin-type electric double-layer capacitor but also to a laminate-type double-layer capacitor heat-sealed with a laminated film, and furthermore can be also applied to the electricity storage device such as various capacitors and secondary batteries in which a cylindrical element wound with the separator interposed between the positive electrode and the negative electrode or a lamination element laminated with the separator interposed between the positive electrode and the negative electrode is used.

EXAMPLES

First Properties Comparison

Properties of the electric double-layer capacitor using the sheet electrode of the present invention are examined. In the present examples and a comparative example, electrodes were made under the following conditions, and electric double-layer capacitors were made using such electrodes to measure various properties. Examples 1 to 8, and Comparative Example 1 and Conventional Example 1 used in the properties comparisons were made in the following methods.

Preparation of Mixed Solutions

First, for mixed solutions of the Examples 1 to 4, steam activated carbon black (hereinafter, "CB") with an average particle diameter of 12 nm was weighed to become 80% by weight with respect to the total amount of the carbon powder and the fibrous carbon in the electrode. Next, as the fibrous carbon with an external diameter of 20 nm and a length of 150 μm, CNT was weighed to become 20% by weight with respect to the total amount of CB and CNT in the electrode. Total weight of CB and CNT was made to become 50 mg. CB and CNT with the total weight of 50 mg were mixed with 50 mL methanol to make the mixed solutions.

Moreover, for mixed solutions of the Examples 5 to 8, steam activated Ketjen Black (hereinafter, "KB") with an average particle diameter of 40 nm was weighed, instead of CB in the Examples 1 to 4, to become 80% by weight with respect to the total amount of the carbon powder and the fibrous carbon in the electrode. Then, CNT with the external diameter of 20 nm and the length of 150 μm, similar to CNT in the Examples 1 to 4, was weighed to become 20% by weight with respect to the total amount of KB and CNT in the electrode. Total weight of KB and CNT was made to become 50 mg. KB and CNT with the total weight of 50 mg were mixed with 50 mL methanol to make the mixed solutions.

Example 1, Example 5

In the Examples 1 and 5, the dispersion treatment by using the ultracentrifuging treatment was applied to the above-mentioned mixed solutions with centrifugal force of 200000 N (kgms$^{-2}$) for 5 minutes to make carbon powder/fibrous carbon/methanol dispersion solutions. The dispersion solutions were vacuum filtered with PTFE filter papers (diameter: 35 mm, average pore size 0.2 μm) to obtain paper-molded carbon powder/fibrous carbon sheet electrodes. The resultants were placed on an aluminum plate, sandwiched with another aluminum plate and pressed upper and lower directions of the plates at a pressure of 10 tcm-2 for 1 minute to obtain carbon powder/fibrous carbon sheet electrodes. The carbon powder/fibrous carbon sheet electrodes were peeled off from the aluminum plates, cut into the same size as a current collector, stuck with a conductive adhesive on stainless steel plates which will be the current collectors, and dried at 120° C. under a normal pressure for 1 hour to obtain two electrode bodies, and then electric double-layer capacitor elements were made with cellulose-based separators interposed therebetween (electrode area: 2.1 cm$^2$). The elements were impregnated with propylene carbonate solutions containing 1 M (=1 mol/cm$^3$) tetrafluoroboric acid tetraethylammonium, as the electrolytic solution, and then heat-sealed with laminated films to make cells for evaluation (electric double-layer capacitors).

Example 2, Example 6

In the Examples 2 and 6, cells for evaluation were made in the same method as the Example 1 except that the dispersion treatment by using the jet mixing was applied to the mixed solutions at a pressure of 200 MPa and a concentration of 0.5 g/l three times to make carbon powder/fibrous carbon/methanol dispersion solutions.

Example 3, Example 7

In the Examples 3 and 7, cells for evaluation were made in the same method as the Example 1 except that the dispersion treatment was applied by agitating the mixed solutions with the mixer for about 30 seconds to make carbon powder/fibrous carbon/methanol dispersion solutions.

Example 4, Example 8

In the Examples 4 and 8, cells for evaluation were made in the same method as the Example 1 except that the dispersion treatment was applied by agitating the mixed solutions with the ball mill for about 300 seconds to make carbon powder/fibrous carbon/methanol dispersion solutions.

Comparative Example 1

In the Comparative Example 1, the mixed solution was changed, and then a cell for evaluation was made in the same method as the Example 3. Specifically, steam activated carbon (raw material: coconut shell) with an average particle diameter of 1 μm was weighed to become 80% by weight with respect to the total amount of the activated carbon and CNT in the electrode. Next, as the fibrous carbon with the external diameter of 20 nm and the length of 150 μm, CNT was weighed to become 20% by weight with respect to the total amount of the activated carbon and CNT in the electrode. Total weight of the activated carbon and CNT was made to become 50 mg. A mixed solution made by mixing the activated carbon and CNT with the total weight of 50 mg with 50 mL methanol was used.

Conventional Example 1

In the Conventional Example 1, an electrode was made in the coating method instead of the sheet electrode made by the filtration according to the present invention. Specifically, the steam activated carbon (raw material: coconut shell) with the average particle diameter of 1 μm and Ketjen Black (hereinafter, "KB") were weighed to become 95% by weight with respect to the total amount of the carbon powder and a resin binder in the electrode. Next, as the resin binder, PTFE was weighed to become 5% by weight with respect to the total amount of the activated carbon and PTFE in the electrode. Total weight of the activated carbon and PTFE was made to become 50 mg. A mixed solution made by mixing the activated carbon and PTFE with the total weight of 50 mg with 50 mL methanol was used. The mixed solution was applied on the stainless steel plate which will be the current collector and dried at 120° C. under the normal pressure for 1 hour to obtain two electrode bodies, and then an electric double-layer capacitor element was made with the cellulose-based separator interposed therebetween (electrode area: 2.1 cm$^2$). The element was impregnated with the propylene carbonate solution containing 1 M (=1 mol/dm$^3$) tetrafluoroboric acid tetraethylammonium, as the electrolytic solution, and then heat-sealed with the laminated film to make a cell for evaluation (electric double-layer capacitor).

Table 1 shows, with respect to the sheet electrodes and the coated electrode of the Examples 1 to 8, the Comparative Example 1 and the Conventional Example 1, the dispersion method; the percentage of the binder or the fibrous carbon; the percentage of the carbon black in the electrode; the electrode density; and the electrode capacitance, the internal resistance, and a low temperature property of the cell for evaluation. The electrode capacitance and the internal resistance with respect to the cells for evaluation of the Examples 1 to 3, the Comparative Example 1 and the Conventional Example 1 are shown as measurement results after voltage application at 3 V for 30 minutes. The low temperature properties were values represented by a ratio of the capacitances (capacitance at −30° C./capacitance at 20° C.)*100% by measuring the electrode capacitances of the cells for evaluation under respective environments at 20° C. and −30° C.

TABLE 1

| | Fibrous carbon or binder | Carbon powder | Electrode molding | Dispersion method | Fibrous carbon or binder (%) | Carbon powder (%) |
|---|---|---|---|---|---|---|
| Example 1 | CNT | CB (12 nm) | Paper-making | Ultra-centrifuging treatment | 20 | 80 |
| Example 2 | CNT | CB (12 nm) | Paper-making | Jet mixing | 20 | 80 |
| Example 3 | CNT | CB (12 nm) | Paper-making | Mixer | 20 | 80 |
| Example 4 | CNT | CB (12 nm) | Paper-making | Ball mill | 20 | 80 |
| Example 5 | CNT | KB (40 nm) | Paper-making | Ultra-centrifuging treatment | 20 | 80 |
| Example 6 | CNT | KB (40 nm) | Paper-making | Jet mixing | 20 | 80 |
| Example 7 | CNT | KB (40 nm) | Paper-making | Mixer | 20 | 80 |
| Example 8 | CNT | KB (40 nm) | Paper-making | Ball mill | 20 | 80 |
| Comparative example 1 | CNT | Activated carbon (1 μm) | Paper-making | Mixer | 20 | 80 |
| Conventional example 1 | PTFE | Activated carbon (1 μm) KB (30 nm) | Coating | — | 5 | 95 |

TABLE 1-continued

|  | Electrode density | Electrode capacitance | Internal resistance | Low temperature property |
|---|---|---|---|---|
| Example 1 | 0.62 g/cc | 14.6 F/cc | 6.3 Ω·cm² | 91% |
| Example 2 | 0.55 g/cc | 13.0 F/cc | 6.6 Ω·cm² | 90% |
| Example 3 | 0.46 g/cc | 10.8 F/cc | 7.2 Ω·cm² | 85% |
| Example 4 | 0.60 g/cc | 11.4 F/cc | 6.8 Ω·cm² | 97% |
| Example 5 | 0.56 g/cc | 13.0 F/cc | 7.2 Ω·cm² | 96% |
| Example 6 | 0.50 g/cc | 11.7 F/cc | 8.0 Ω·cm² | 95% |
| Example 7 | 0.42 g/cc | 9.8 F/cc | 8.2 Ω·cm² | 90% |
| Example 8 | 0.54 g/cc | 9.9 F/cc | 7.8 Ω·cm² | 97% |
| Comparative example 1 | 0.70 g/cc | 16.0 F/cc | 10.0 Ω·cm² | 64% |
| Conventional example 1 | 0.61 g/cc | 13.4 F/cc | 25.0 Ω·cm² | 62% |

Comparison is made to the respective properties of the Examples 1 to 8, the Comparative Example 1 and the Conventional Example 1 shown in Table 1. In the Conventional Example 1, which is the coated electrode made by using PTFE as the binder, the electrode density and the electrode capacitance are relatively high since the particle diameter of the activated carbon is large. However, since the resin-based binder is used, the values show that the internal resistance and the low temperature property are deteriorated in spite of the small amount of the resin binder. Also, in the Comparative Example 1 in which the mixed solution was filtered in the same manner as the present invention, the electrode density and the electrode capacitance are high. However, since the particle diameter of the activated carbon is large, the diffusion resistance increases in spite of not using the resin binder. Therefore, the values show that the internal resistance and the low temperature property are deteriorated.

In contrast, in the Examples 1 to 4 made by filtering the mixed solutions in which CB with the average particle diameter of 12 nm and CNT with the external diameter of 20 nm and the length of 150 μm were dispersed, the internal resistance and the low temperature property are extremely superior in comparison with the Comparative Example 1 and the Conventional Example 1.

Similarly, in the Examples 5 to 8 made by filtering the mixed solutions in which KB with the average particle diameter of 40 nm and CNT with the external diameter of 20 nm and the length of 150 μm were dispersed, the internal resistance and the low temperature property are extremely superior in comparison with the Comparative Example 1 and the Conventional Example 1.

In particular, the electrode density of the Examples 1 and 5 in which the dispersion step was performed by using the ultracentrifuging treatment is 0.62 g/cc and 0.56 g/cc, the electrode density of the Examples 2 and 6 in which the jet mixing was applied is 0.55 g/cc and 0.50 g/cc, and the electrode density of the Examples 4 and 8 in which the dispersion step was performed by using the ball mill is 0.60 g/cc and 0.54 g/cc. Therefore, high density of 0.50 g/cc or more is shown. That is, in the Examples 1, 2, 4 to 6 and 8 in which the carbon powder and the fibrous carbon were highly dispersed, the internal resistance and the low temperature property are good, and the electrode density is high, and furthermore it is shown that the electrode capacitance is substantially increased in comparison with the Examples 3 and 7 in which the carbon powder and the fibrous carbon were dispersed by using the mixer.

Moreover, when the carbon materials used for the electrodes of the Examples 1, 5 and the Comparative Example 1 were analyzed, respectively, the following states were shown. As the measurement method, a nitrogen gas adsorption method was applied. The specific surface area was calculated by BET method.

TABLE 2

|  | Specific surface area | Percentage of micropores | Percentage of mesopores | Percentage of macropores |
|---|---|---|---|---|
| Example 1 | 1450 m²/g | 83% | 15% | 2% |
| Example 5 | 1210 m²/g | 45% | 52% | 3% |
| Comparative example 1 | 1630 m²/g | 98% | 1.5% | 0.5% |

Comparison is made to the respective properties of the Examples 1, 5 and the Comparative Example 1 shown in Table 2. It is shown that, in the Comparative Example 1 in which the internal resistance and the low temperature property are deteriorated, the percentage of mesopores is low in comparison with the Examples 1 and 5. On the other hand, it is shown that, in the Examples 1 and 5 in which the internal resistance and the low temperature property are extremely superior, the percentage of the mesopores, whose pore size is large, is increased and thereby the resistance is reduced. When the percentage of the mesopores is within the range of 5 to 55%, the internal resistance and the low temperature property are extremely superior.

Figure 11:
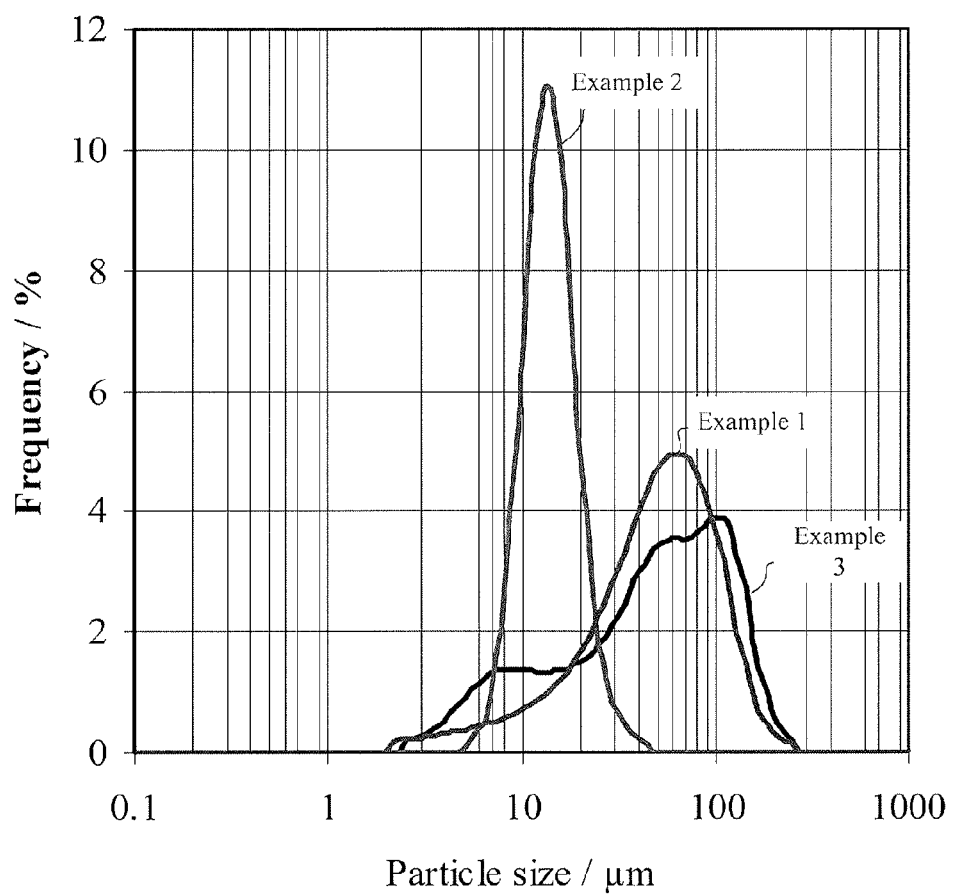
FIG. 11 is particle size distributions of Examples 1 to 3 according to the present embodiment.

Next, the sheet electrode made by filtering the mixed solution highly dispersed through the ultracentrifuging treatment is studied. The carbon materials used for the electrodes of the Examples 1 to 3 were analyzed, respectively. Table 3 shows 50% cumulative particle diameter: D50 (median particle size) and 90% cumulative particle diameter: D90 of the Examples 1 to 3. FIG. 11 shows particle size distributions of the Examples 1 to 3. The particle size distributions were measured in states that the sheet electrodes (1 cm²) of the Examples 1 to 3 were introduced into the isopropyl alcohol (IPA) solutions and dispersed with the homogenizer (24000 rpm, 5 minutes).

TABLE 3

|  | Dispersion method | D90/D50 | D90 | D50 (Median particle size) |
|---|---|---|---|---|
| Example 1 | Ultracentrifuging treatment | 2.1 | 105 μm | 50 μm |
| Example 2 | Jet mixing | 1.5 | 20 μm | 13 μm |
| Example 3 | Mixer | 2.6 | 124 μm | 48 μm |

FIG. 11 shows that the particle size distributions of the Examples 1 and 2 are so-called normal distributions with a single peak. Thereby, it is shown that the sheet electrodes obtained in the Examples 1 and 2 have a uniform surface state and high density.

Furthermore, Table 3 shows that the sharper particle size distribution is obtained by setting the D90 to less than 110 µm and thus, in the Examples 1 and 2, the optimum sheet electrodes with the extremely superior internal resistance and capacitance can be obtained. In contrast, when the D90 is more than 110 µm, the internal resistance and the capacitance are reduced.

Moreover, D90/D50, the electrode density, the capacitance, and the internal resistance of the sheet electrodes of the Examples 1 to 3 were analyzed, respectively. Table 4 shows D90/D50, the electrode density, the capacitance, and the internal resistance of the sheet electrodes of the Examples 1 to 3.

TABLE 4

|  | D90/D50 | Electrode density | Capacitance | Internal resistance |
|---|---|---|---|---|
| Example 1 | 2.1 | 0.62 g/cc | 14.6 F/cc | 6.3 Ω·cm$^2$ |
| Example 2 | 1.5 | 0.55 g/cc | 13.0 F/cc | 6.6 Ω·cm$^2$ |
| Example 3 | 2.6 | 0.46 g/cc | 10.8 F/cc | 7.2 Ω·cm$^2$ |

Table 4 shows that, by setting the D90/D50 value to 2.5 or less to obtain a particle size distribution with a sharp peak, the sheet electrode is brought to the uniform surface state and made high density. Therefore, in the Examples 1 and 2, the internal resistance and the capacitance can be superior. In contrast, when the D90/D50 value is 2.6 or more, uniformity of the surface state in the sheet electrode is partially collapsed, so that the electrode density is reduced.

Second Properties Comparison

In the second properties comparison, electrodes were made by changing the percentage of the carbon powder and CNT contained in the mixed solution of the Example 1 in which the dispersion step was performed by using the ultracentrifuging treatment Then electric double-layer capacitors were made using the electrodes to measure various properties. Also, with respect to the Example 2 in which the dispersion step was performed by using the jet mixing and the Example 4 in which it was performed by using the ball mill, electrodes were made by changing the percentage of CB and CNT, and then electric double-layer capacitors were made using the electrodes to measure various properties.

Example 1-1 to Example 1-6

Cells for evaluation were made in the same manner as that described in the Example 1. However, the percentages of CB and CNT contained in the mixed solution were changed as shown in Table 5.

Table 5 shows, with respect to the sheet electrodes of the Example 1-1 to the Example 1-6, the dispersion method; the percentage of the fibrous carbon in the electrode; the percentage of the carbon material in the electrode; the electrode density; the electrode capacitance, the internal resistance, and a degree of case expansion of the cell for evaluation. Note that, for the degree of case expansion, a thickness of the cell for evaluation after voltage application at 3 V for 30 minutes was compared with a reference thickness before the voltage application, and then the expansion of more than 20% was indicated by cross, the expansion within the range of 20 to 10% was indicated by triangle, and the expansion of less than 10% was indicated by circle.

TABLE 5

|  | Fibrous carbon | Carbon powder | Sheet molding | Dispersion method | Fibrous carbon (%) | Carbon powder (%) |
|---|---|---|---|---|---|---|
| Example 1-1 | CNT | CB (12 nm) | Paper-making | Ultra-centrifuging treatment | 5 | 95 |
| Example 1-2 | CNT | CB (12 nm) | Paper-making | Ultra-centrifuging treatment | 10 | 90 |
| Example 1-3 | CNT | CB (12 nm) | Paper-making | Ultra-centrifuging treatment | 20 | 80 |
| Example 1-4 | CNT | CB (12 nm) | Paper-making | Ultra-centrifuging treatment | 30 | 70 |
| Example 1-5 | CNT | CB (12 nm) | Paper-making | Ultra-centrifuging treatment | 40 | 60 |
| Example 1-6 | CNT | CB (12 nm) | Paper-making | Ultra-centrifuging treatment | 50 | 50 |

|  | Electrode density | Electrode capacitance | Internal resistance | Case expansion |
|---|---|---|---|---|
| Example 1-1 | 0.54 g/cc | 13.2 F/cc | 8.4 Ω·cm2 | ○ |
| Example 1-2 | 0.55 g/cc | 13.4 F/cc | 7.7 Ω·cm2 | ○ |
| Example 1-3 | 0.62 g/cc | 14.6 F/cc | 6.3 Ω·cm2 | ○ |
| Example 1-4 | 0.61 g/cc | 13.9 F/cc | 6.7 Ω·cm2 | Δ |
| Example 1-5 | 0.60 g/cc | 13.5 F/cc | 7.2 Ω·cm2 | X |

TABLE 5-continued

| | | | | |
|---|---|---|---|---|
| Example 1-6 | 0.63 g/cc | 13.6 F/cc | 7.6 Ω · cm2 | X |

Comparison is made to the respective properties of the Example 1-1 to the Example 1-6 in Table 5. It is shown that good results are obtained regarding the electrode density and electrostatic capacitance in any Example. Regarding the internal resistance, the Example 1-2 to the Example 1-6 with the percentage of CNT of 10% by weight or more show a good result in comparison with the Example 1-1. Regarding the degree of case expansion, the Example 1-1 to the Example 1-4 with the percentage of CNT of 30% by weight or less show a good result in comparison with the Examples 1-5 and 1-6. Regarding the electrode density and the electrode capacitance, any Example shows a good result in comparison with the Example 3 shown in Table 1, in which the mixer was used for the dispersion.

Example 2-1 to Example 2-6

Next, the sheet electrode made by filtering the mixed solution highly dispersed by the jet mixing is studied. In the Example 2-1 to the Example 2-6, cells for evaluation were made in the same manner as that described in the Example 2. However, the percentages of CB and CNT contained in the mixed solution were changed as shown in Table 6.

Table 6 shows, with respect to the sheet electrodes of the Example 2-1 to the Example 2-6, the dispersion method; the percentage of the fibrous carbon in the electrode; the percentage of the carbon material in the electrode; the electrode density; the electrode capacitance, the internal resistance, and the degree of case expansion of the cell for evaluation.

TABLE 6

| | Fibrous carbon | Carbon powder | Sheet molding | Dispersion method | Fibrous carbon (%) | Carbon powder (%) |
|---|---|---|---|---|---|---|
| Example 2-1 | CNT | CB (12 nm) | Paper-making | Jet mixing | 5 | 95 |
| Example 2-2 | CNT | CB (12 nm) | Paper-making | Jet mixing | 10 | 90 |
| Example 2-3 | CNT | CB (12 nm) | Paper-making | Jet mixing | 20 | 80 |
| Example 2-4 | CNT | CB (12 nm) | Paper-making | Jet mixing | 30 | 70 |
| Example 2-5 | CNT | CB (12 nm) | Paper-making | Jet mixing | 40 | 60 |
| Example 2-6 | CNT | CB (12 nm) | Paper-making | Jet mixing | 50 | 50 |

| | Electrode density | Electrode capacitance | Internal resistance | Case expansion |
|---|---|---|---|---|
| Example 2-1 | 0.48 g/cc | 11.7 F/cc | 8.4 Ω · cm2 | ◯ |
| Example 2-2 | 0.49 g/cc | 12.0 F/cc | 7.2 Ω · cm2 | ◯ |
| Example 2-3 | 0.55 g/cc | 13.0 F/cc | 6.6 Ω · cm2 | ◯ |
| Example 2-4 | 0.54 g/cc | 12.4 F/cc | 7.0 Ω · cm2 | Δ |
| Example 2-5 | 0.53 g/cc | 12.0 F/cc | 7.5 Ω · cm2 | X |
| Example 2-6 | 0.56 g/cc | 12.1 F/cc | 7.9 Ω · cm2 | X |

Comparison is made to the respective properties of the Example 2-1 to the Example 2-6 in Table 6. It is shown that good results are obtained regarding the electrode density and the electrostatic capacitance in any Example. Regarding the internal resistance, the Example 2-2 to the Example 2-6 with the percentage of CNT of 10% by weight or more show a good result in comparison with the Example 2-1. Regarding the degree of case expansion, the Example 2-1 to the Example 2-4 with the percentage of CNT of 30% by weight or less show a good result in comparison with the Examples 2-5 and 2-6. Moreover, the electrode density is 0.48 g/cc or more in any Example and, regarding the electrode capacitance, good results are obtained in comparison with the Example 3 shown in Table 1, in which the mixer was used for the dispersion.

Example 4-1 to Example 4-6

Next, the sheet electrode made by filtering the mixed solution highly dispersed by the ball mill is studied. In the Example 4-1 to the Example 4-6, cells for evaluation were made in the same manner as that described in the Example 4. However, the percentages of CB and CNT contained in the mixed solution were changed as shown in Table 7.

Table 7 shows, with respect to the sheet electrodes of the Example 4-1 to the Example 4-6, the dispersion method; the percentage of the fibrous carbon in the electrode; the percentage of the carbon material in the electrode; the electrode density; the electrode capacitance, the internal resistance, and the degree of case expansion of the cell for evaluation. Note that, for the degree of case expansion, a thickness of the cell for evaluation after the voltage application at 3 V for 30 minutes was compared with a reference thickness before the voltage application, and then the expansion of more than 20% was indicated by cross, the expansion within the range of 20 to 10% was indicated by triangle, and the expansion of less than 10% was indicated by circle.

TABLE 7

| | Fibrous carbon | Carbon powder | Sheet molding | Dispersion method | Fibrous carbon (%) | Carbon powder (%) |
|---|---|---|---|---|---|---|
| Example 4-1 | CNT | CB (12 nm) | Paper-making | Ball mill | 5% | 95% |
| Example 4-2 | CNT | CB (12 nm) | Paper-making | Ball mill | 10% | 90% |
| Example 4-3 | CNT | CB (12 nm) | Paper-making | Ball mill | 20% | 80% |
| Example 4-4 | CNT | CB (12 nm) | Paper-making | Ball mill | 30% | 70% |
| Example 4-5 | CNT | CB (12 nm) | Paper-making | Ball mill | 40% | 60% |
| Example 4-6 | CNT | CB (12 nm) | Paper-making | Ball mill | 50% | 50% |

| | Electrode density | Electrode capacitance | Internal resistance | Case expansion |
|---|---|---|---|---|
| Example 4-1 | 0.52 g/cc | 10.3 F/cc | 9.1 Ω · cm$^2$ | ◯ |
| Example 4-2 | 0.53 g/cc | 10.4 F/cc | 8.2 Ω · cm$^2$ | ◯ |
| Example 4-3 | 0.60 g/cc | 11.4 F/cc | 6.8 Ω · cm$^2$ | ◯ |
| Example 4-4 | 0.59 g/cc | 10.8 F/cc | 7.3 Ω · cm$^2$ | Δ |

TABLE 7-continued

| | | | | |
|---|---|---|---|---|
| Example 4-5 | 0.58 g/cc | 10.5 F/cc | 7.7 Ω · cm² | X |
| Example 4-6 | 0.61 g/cc | 10.5 F/cc | 8.2 Ω · cm² | X |

Comparison is made to the respective properties of the Example 4-1 to the Example 4-6 in Table 7. It is shown that good results are obtained regarding the electrode density and electrostatic capacitance in any Example. Regarding the internal resistance, the Example 4-2 to the Example 4-6 with the percentage of CNT of 10% by weight or more show a good result in comparison with the Example 4-1. Moreover, regarding the degree of case expansion, the Example 4-1 to the Example 4-4 with the percentage of CNT of 30% by weight or less show a good result in comparison with the Examples 4-5 and 4-6. The electrode density is 0.48 g/cc or more in any Example and, regarding the electrode capacitance, good results are obtained in comparison with the Example 3 shown in Table 1, in which the mixer was used for the dispersion.

Third Properties Comparison

In the third properties comparison, electric double-layer capacitors were made by impregnating electrodes, which were made by highly dispersing the carbon powder and the fibrous carbon in the dispersion step by using the ultracentrifuging treatment, with electrolytic solutions as shown in Table 8 to measure various properties.

Example 1-7 to Example 1-10

Cells for evaluation were made in the same manner as that described in the Example 1. However, the electrolytic solution with which the electric double-layer capacitor element was impregnated was changed to SLF (sulfolane) and EiPS (ethyl isopropyl sulfone) containing 1.4 M (=1.4 mol/dm³) TEMABF$_4$ (tetrafluoroboric acid tetraethylammonium) in the Example 1-7. Also, the electrolytic solution was changed to SLF and 3-MeSLF (3-methylsulfolane) containing 1.4M TEMABF$_4$ in the Example 1-8, to SLF containing 1.4M TEMABF$_4$ in the Example 1-9, and to PC (propylene carbonate) containing 1.4M TEMABF$_4$ in the Example 1-10.

Table 8 shows, with respect to the sheet electrodes of the Example 1-7 to the Example 1-10, the dispersion method; a type of the electrolytic solution, the percentage of the fibrous carbon in the electrode; the percentage of the carbon material in the electrode; the electrode capacitance, the low temperature property, and a capacitance retention rate after 500 hours of the cell for evaluation. The electrode capacitances are shown as measurement results after voltage application at 3.5 V for 30 minutes. The capacitance retention rates were values represented by a ratio of the capacitances (capacitance after the voltage application for 500 hours/capacitance after the voltage application for 30 minutes)*100% following measurement of the electrode capacitances after the voltage application at 3.5 V for 30 minutes and at 3.5 V for 500 hours. The low temperature properties were values represented by a ratio of the capacitances (capacitance at −30° C./capacitance at 20° C.) *100% after the electrode capacitances of the cells for evaluation were measured under each environment at 20° C. and −30° C.

TABLE 8

| | Fibrous carbon or binder | Carbon powder | Sheet molding | Dispersion method | Electrolytic solution | Fibrous carbon (%) | Carbon powder (%) |
|---|---|---|---|---|---|---|---|
| Example 1-7 | CNT | CB (12 nm) | Paper-making | Ultra-centrifuging treatment | SLF + EiPS | 20% | 80% |
| Example 1-8 | CNT | CB (12 nm) | Paper-making | Ultra-centrifuging treatment | SLF + 3-MeSLF | 20% | 80% |
| Example 1-9 | CNT | CB (12 nm) | Paper-making | Ultra-centrifuging treatment | SLF | 20% | 80% |
| Example 1-10 | CNT | CB (12 nm) | Paper-making | Ultra-centrifuging treatment | PC | 20% | 80% |

| | Electrode capacitance | Low temperature property | Capacitance retention rate |
|---|---|---|---|
| Example 1-7 | 15.0 F/cc | 80% | 96% |
| Example 1-8 | 14.4 F/cc | 84% | 97% |
| Example 1-9 | 15.8 F/cc | Un-measurable | 95% |
| Example 1-10 | 16.1 F/cc | 91% | 33% |

Comparison is made to the respective properties of the Example 1-7 to the Example 1-10 in Table 8. In the Example 1-10 in which sulfolane, a sulfolane compound, or chain sulfone was not used as the electrolytic solution, the capacitance retention rate after 500 hours is extremely reduced. In the Example 1-9 in which sulfolane was used as the electrolytic solution, the low temperature property could not be measured. On the other hand, in the Example 1-8 in which sulfolane and EiPS, which is chain sulfone, were used as the electrolytic solution and the Example 1-9 in which sulfolane and 3-MeSLF, which is a sulfolane compound having a side chain on a sulfolane skeleton, were used as the electrolytic solution, reduction in the electrode capacitance over time is suppressed to the capacitance retention rate after 500 hours of 95% and good low temperature properties of more than 80% are shown. Although the dispersion method by using the ultracentrifuging dispersion treatment was applied in this properties comparison, even when the dispersion methods by using the jet mixing and the ball mill were applied, the same effect could be developed by using sulfolane and a sulfolane compound which has a side chain on a sulfolane skeleton, or the chain sulfone as the electrolytic solution.

From the above, by using a combination of sulfolane and the sulfolane compound which has a side chain on a sulfolane skeleton, or sulfolane and the chain sulfone as the electrolytic solution with which the electric double-layer capacitor element is impregnated, a superior electric double-layer capacitor in terms of the low temperature property and the capacitance retention rate after elapse of long time can be made.

EXPLANATION OF REFERENCE NUMERALS

1 . . . Negative electrode case
2 . . . Electrolyte
3 . . . Electrode
4 . . . Separator
5 . . . Electrode
6 . . . Positive electrode case
7 . . . Gasket

What is claimed is:

1. An electrode obtained by removing a solvent from a solution into which pore-forming-treated carbon powder with an average particle size of less than 100 nm and a fibrous carbon are dispersed,
   wherein a particle size distribution of an aggregate of the carbon powder and the fibrous carbon constituting the electrode has a single peak, and
   a ratio D90/D50, which is a ratio between 50% cumulative particle diameter D50 and 90% cumulative particle diameter D90 in the particle size distribution, is 2.5 or less.

2. The electrode according to claim 1, wherein the solvent is removed by filtering the solution.

3. The electrode according to claim 1, wherein the carbon powder is activated carbon black.

4. The electrode according to claim 1, wherein
   the carbon powder and the fibrous carbon are highly dispersed, and
   electrode density of the electrode is 0.48 g/cc or more.

5. The electrode according to claim 1, wherein the fibrous carbon is contained at 10 to 30% by weight with respect to the total amount of the carbon powder and the fibrous carbon.

6. The electrode according to claim 1, wherein a percentage of mesopores among pores in the pore-forming-treated carbon powder is within a range of 5 to 55%.

7. The electrode according to claim 1, wherein the 90% cumulative particle diameter D90 in the particle size distribution is less than 110 µm.

8. The electrode according to claim 1, wherein intervals between the fibrous carbon constituting the electrode are 2 µm or less.

9. An electric double-layer capacitor, including electrodes according to claim 1, wherein the electrodes impregnated with a mixture of sulfolane and a sulfolane compound, which has a side chain on a sulfolane skeleton, or chain sulfone.

10. The electric double-layer capacitor according to claim 9, wherein the electrodes are formed on a current collector.

11. A manufacturing method of an electrode, comprising:
    a dispersion step, in which pore-forming-treated carbon powder with an average particle size of less than 100 nm and a fibrous carbon are dispersed into a solvent; and
    a sheet electrode forming step, in which a carbon powder/fibrous carbon sheet is obtained by removing the solvent from a solution obtained in the dispersion step,
    wherein a particle size distribution of an aggregate of the carbon powder and the fibrous carbon constituting the electrode has a single peak, and
    a ratio D90/D50, which is a ratio between 50% cumulative particle diameter D50 and 90% cumulative particle diameter D90 in the particle size distribution, is 2.5 or less.

12. The manufacturing method of the electrode according to claim 11, wherein, in the sheet electrode forming step, the solvent is removed by filtering the solution.

13. The manufacturing method of the electrode according to claim 11, wherein the carbon powder is activated carbon black.

14. The manufacturing method of the electrode according to claim 11, wherein the dispersion step is a treatment of allowing jets of the solution to collide with each other.

15. The manufacturing method according to claim 11, wherein the dispersion step is a treatment of applying shear stress and centrifugal force to the solution.

16. The electrode according to claim 11, wherein the 90% cumulative particle diameter D90 in the particle size distribution is less than 110 µm.

17. An electrode obtained by removing a solvent from a solution into which pore-forming-treated carbon powder with an average particle size of less than 100 nm and a fibrous carbon are dispersed,
    wherein intervals between the fibrous carbon constituting the electrode are 2 µm or less.

18. The electrode according to claim 17, wherein the carbon powder is activated carbon black.

19. The electrode according to claim 17, wherein
    the carbon powder and the fibrous carbon are highly dispersed, and
    electrode density of the electrode is 0.48 g/cc or more.

20. An electric double-layer capacitor including electrodes according to claim 17, wherein the electrodes are formed on a current collector.

* * * * *